June 2, 1931.  F. B. SHEERAR  1,808,263
SERVICE WINDOW FOR MOTOR VEHICLES
Filed Feb. 11, 1929
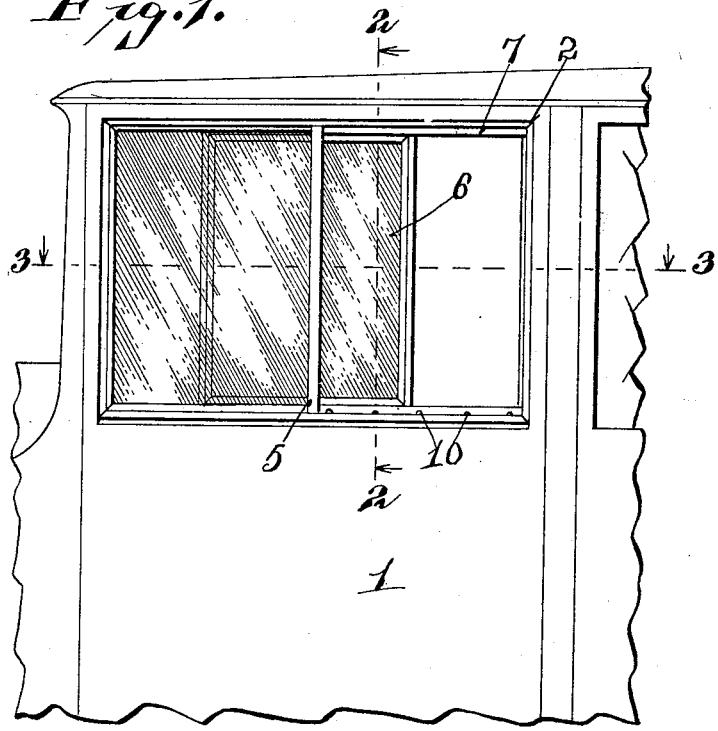
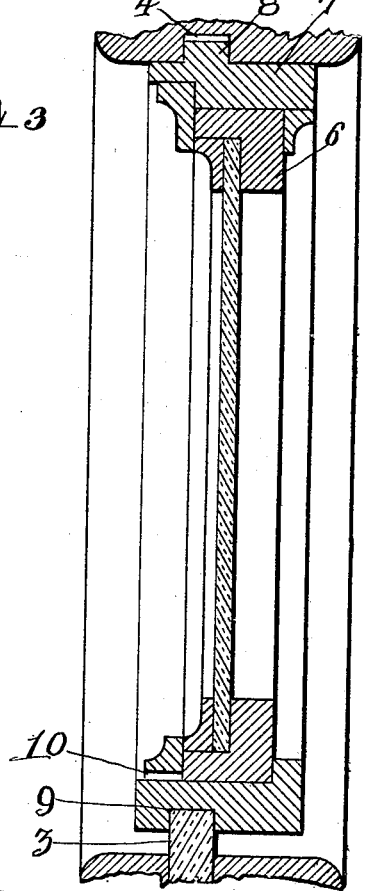
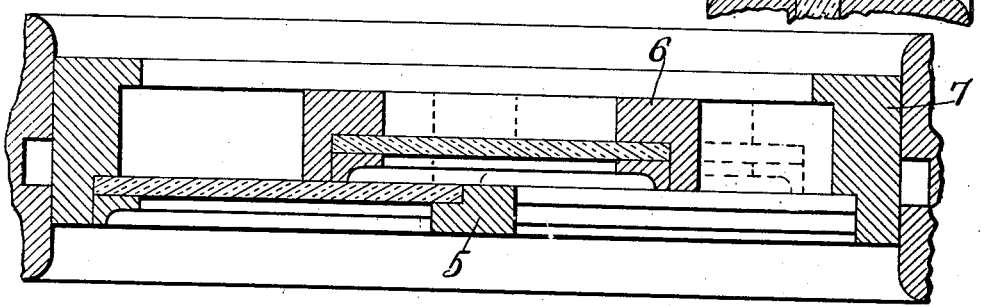

Patented June 2, 1931

1,808,263

UNITED STATES PATENT OFFICE

FRANK B. SHEERAR, OF OMRO, WISCONSIN

SERVICE WINDOW FOR MOTOR VEHICLES

Application filed February 11, 1929. Serial No. 339,167.

This invention relates to window construction and more particularly to what will be known as a service window for motor vehicles.

One of the objects of my invention is the provision of a service window adapted to be removably positioned in the side openings at the front of the vehicle whereby to eliminate the necessity of opening the entire window when it is desired to extend the hand therethrough for the purpose of signalling vehicles in the rear and will replace the usual movable glass window now in use.

Another object of my invention is the provision of a service window which is to be positioned in the side windows of the front part of a motor vehicle body, after the regular glass window has been lowered and comprises a stationary part and a movable part, the movable part adapted to be adjusted so as to provide an opening sufficient to permit the hand to be extended therethrough for signalling purposes, thus eliminating the necessity of having the entire window open when it is desired to use the same for such purposes.

Another object of my invention is the provision of a service window of the above type which is so constructed that it may be readily positioned within the side frame of a motor vehicle window after the regular movable glass pane has been lowered and includes in its construction means whereby the glass pane may co-operate with the window for retaining the same in position.

With the above and other objects in view, the invention consists in the novel features of construction, the combination and arrangement of parts hereinafter more fully set forth, pointed out in the claim and shown in the accompanying drawings wherein:

Figure 1 is a detailed side elevation of a front portion of a motor vehicle body, illustrating the use of my invention;

Figure 2 is a vertical section on the line 2—2 of Figure 1;

Figure 3 is a horizontal section on the line 3—3 of Figure 1.

In the accompanying drawings, I have illustrated a small part of the motor vehicle body 1, preferably of the closed type and it is provided with the usual front window openings 2. These window openings ordinarily are closed by means of a movable pane of glass which lowers into the wall of the body or the front door thereof, the pane being illustrated at 3 in Figure 2 in its lowered position with my improved service window placed in the opening 2. In the construction, the upper side of the window opening is provided with a longitudinal groove which receives the upper edge of the glass pane 3 when it is in its closed position.

My improved service window comprises a normally stationary sash 5 and a movable sash 6 mounted in the frame 7, said frame having upon its upper edge a longitudinal tongue 8 which is adapted to be fitted in the groove 4 when the frame is placed in position in one of the openings 2.

The lower side of the frame 7 is provided with a longitudinal groove 9 adapted to receive the upper edge of the glass pane 3 so as to securely maintain the frame 7 within the openings 2.

The fitting of the tongue 8 into the groove 4 and the fitting of the glass pane 3 in the groove 9 is clearly illustrated in Figure 2 and it will be apparent from this structure that the frame 7 will be securely held in position as these tongue groove connections extend lengthwise of the window opening as illustrated in Figure 1.

The outer stops at the lower side of the frame 7 are provided with a plurality of transverse openings 10 which communicate with the lowermost groove in which the sash 6 is slidably movable. This permits draining of water or moisture which would accumulate in the groove when the movable sash 6 is in an open position. It will be apparent that in a great many instances, moisture will accumulate on the windows and run downwardly upon the inside in which the sash is slidably mounted and this will drain out through the openings 10.

In Figure 1, I have illustrated my improved service window in position with the movable sash 6 in a partly open position which will permit the hand to be extended therethrough for signalling purposes.

In placing my improved service window in position for use, the usual glass pane 3 which normally closes the openings 2 is lowered to the bottom of the window opening and the frame 7 is then placed in the opening with the tongue 8, engaging the groove 4. The pane 3 is then raised to engage within the groove 9. This structure will securely maintain the frame 7 against lateral movement with respect to the vehicle body and also retain the same against chattering and effect a tight connection between the window in the vehicle body and the frame itself. It will be noted from Figure 1, that the improved service window practically replaces, to a certain extent, the glass pane 3, but with my improved window, it is only necessary to open a small part thereof, instead of entirely moving the pane or closure from the opening as is usually the case when the solid pane is used.

My improved service window is extremely simple in construction and can be readily applied to all types of motor vehicles with but very little necessary change and the window can be quickly placed in position or removed as desired.

While I have shown and described the preferred embodiment of my invention, it will be apparent that slight changes may be made in the construction when putting the invention into practice without departing from the spirit of the same or the scope of the appended claim.

I claim:

In a motor vehicle body having a window opening, a movable member normally closing the opening, one side of the opening having a longitudinal groove in the wall, a frame member having a longitudinal groove in one side thereof, a tongue projecting from the other side of the frame to be received in the groove of the window opening, said movable member engaging the groove in the opposite side of the frame to retain the frame against lateral movement relative to the opening, a stationary and a movable sash within said frame, stops carried by the frame for retaining the sash against lateral movement and one of said stops being formed with a plurality of openings to provide means for drainage.

In testimony that I claim the foregoing I have hereunto set my hand at Omro, in the County of Winnebago and State of Wisconsin.

FRANK B. SHEERAR.